United States Patent [19]
Ackermann et al.

[11] 4,389,844
[45] Jun. 28, 1983

[54] TWO STAGE STIRLING ENGINE

[75] Inventors: Robert A. Ackermann; Nicholas G. Vitale, both of Schenectady, N.Y.

[73] Assignee: Mechanical Technology Incorporated, Latham, N.Y.

[21] Appl. No.: 272,568

[22] Filed: Jun. 11, 1981

[51] Int. Cl.$^3$ .............................................. F02G 1/04
[52] U.S. Cl. ........................................ 60/517; 60/525
[58] Field of Search ........................ 60/517, 525, 526

[56] References Cited

U.S. PATENT DOCUMENTS

| | | | |
|---|---|---|---|
| 3,845,624 | 11/1974 | Roos | 60/517 |
| 3,902,328 | 9/1975 | Claudet | 62/6 |
| 3,939,657 | 2/1976 | Postma et al. | 60/526 |
| 4,004,421 | 1/1977 | Cowans | 60/516 |

Primary Examiner—Allen M. Ostrager
Attorney, Agent, or Firm—Joseph V. Claeys; Arthur N. Trausch, III

[57] ABSTRACT

A two-stage harmonic reciprocating Stirling engine has a primary heater and a pair of regenerators with an intermediate heat exchanger disposed in the fluid flow between the two regenerators. High temperature heat above 5000° F. is supplied to the heater head of the engine while lower temperature, otherwise wasted, heat between 500° F. and 1500° is supplied to the intermediate heat exchanger. The lower temperature heat can be from exhaust gases of the primary burner, or can be waste heat from another process for use in a cogeneration installation.

2 Claims, 5 Drawing Figures

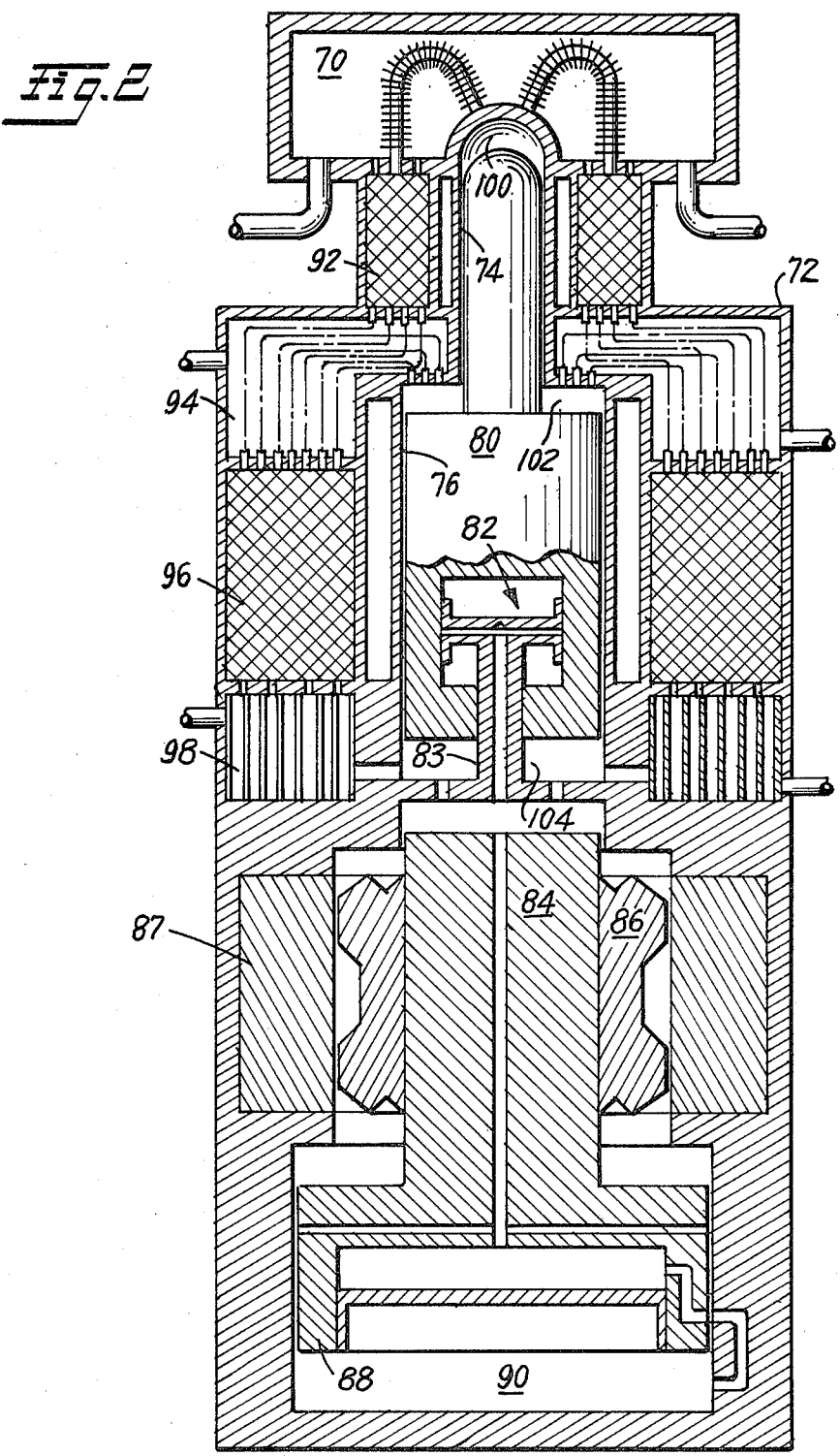

TWO STAGE STIRLING ENGINE

BACKGROUND OF THE INVENTION

This invention relates to a system including a Stirling engine which utilizes heat at two temperatures, and more particularly to a Stirling engine having a high temperature heat exchanger which provides heat to the thermodynamic cycle at a high temperature, and an additional heat exchanger which accepts waste heat from another process or from the high temperature heat exchanger exhaust to increase the energy input into the engine.

The potential efficiencies and low emissions of the Stirling engine have inspired renewed interest and considerable development efforts in this technology. However, some development programs of great magnitude have been abandoned, in part because of the fundamental difficulty of power density. The power output of the Stirling engine when compared to its weight and cost has always been low compared to the conventional internal combustion engine. Since the Stirling engine utilizes a closed cycle for the working fluid, it is necessary that the structure for adding heat at high temperature and rejecting heat at low temperature be very efficient. However, there are certain basic limitations to the efficiency of the heat exchangers and regenerators in a Stirling engine. In order to achieve good heat exchange, it is necessary that the working fluid be exposed to a large surface area of the heat exchanger. This results, in practice, that high viscous losses are incurred in the heat exchangers, and that the heat exchangers and regenerator are relatively heavy. In addition, the necessity of adding large amounts of heat at high temperature through the primary heat exchanger imposes extremely stringent demands on the materials involved. The problem of adding high temperature heat in large quantities through a fine heat exchanger is in part the difficulty of regulating the temperature so that the temperature limit of the materials of the heat exchanger are not exceeded in localized areas.

Another difficulty encountered in the use of Stirling engines is that of efficiently utilizing all of the fuel energy in the burner so that energy is not wasted in high temperature burner exhaust. In practice, this has been most effectively achieved in a combustor preheater in which the burner exhaust gases are used to preheat the intake air so that the air for combustion arrives at the burner nozzles at a relatively high temperature and therefore less fuel is required to achieve the desired temperature of the combustion products. Although this may be a satisfactory solution in terms of laboratory results, it is not a satisfactory commercial solution because the preheater is bulky, heavy, complicated and expensive.

The failure of prior development programs to develop a commercially viable Stirling engine for most prime mover applications in spite of the intense efforts which the art has been exerting to find a solution to the problems, illustrates the difficulty of these fundamental problems. A solution to both of these problems in a single engine configuration would be a welcome development indeed.

SUMMARY OF THE INVENTION

Accordingly, it is an object of the invention to provide a Stirling engine having a heat exchanger-regenerator system in combination with a heat input system and piston configuration that accepts limited amounts of heat at high temperature and the balance of the heat required for operation at an intermediate temperature. This arrangement permits the utilization of a low temperature heat source, such as the burner exhaust gases, in the intermediate heat exchanger so that the combustor preheater can be smaller or eliminated altogether. The high temperature heater and heat exchanger can be relatively small, light and inexpensive since the amount of heat and working fluid which they must handle is reduced by the amount of heat input and working fluid processed by the intermediate heat exchanger.

These and other objects of the invention are provided by a Stirling engine having a two-stage displacer which displaces working fluid through two heat exchangers and regenerators arranged in series/parallel. The heat exchangers operate at different temperatures, one at the temperature of the high temperature heat source and the other at the temperature of the waste heat or lower temperature heat source which the engine utilizes. The waste heat can be from a separate process altogether when the Stirling engine is used in a cogeneration installation. In an automotive Stirling engine application, the intermediate heat exchanger can utilize the hot exhaust gases from the primary burner or some other source of heat generated during operation of the automobile.

DESCRIPTION OF THE DRAWINGS

The invention and its many attendant objects and advantages will be better understood by reference to the following detailed description of the preferred embodiments when read in conjunction with the following drawings, wherein:

FIG. 2 is a Stirling engine made in accordance with this invention and configured as a free piston harmonic heat engine having electrical output;

DESCRIPTION OF THE PREFERRED EMBODIMENT

Figure 1:
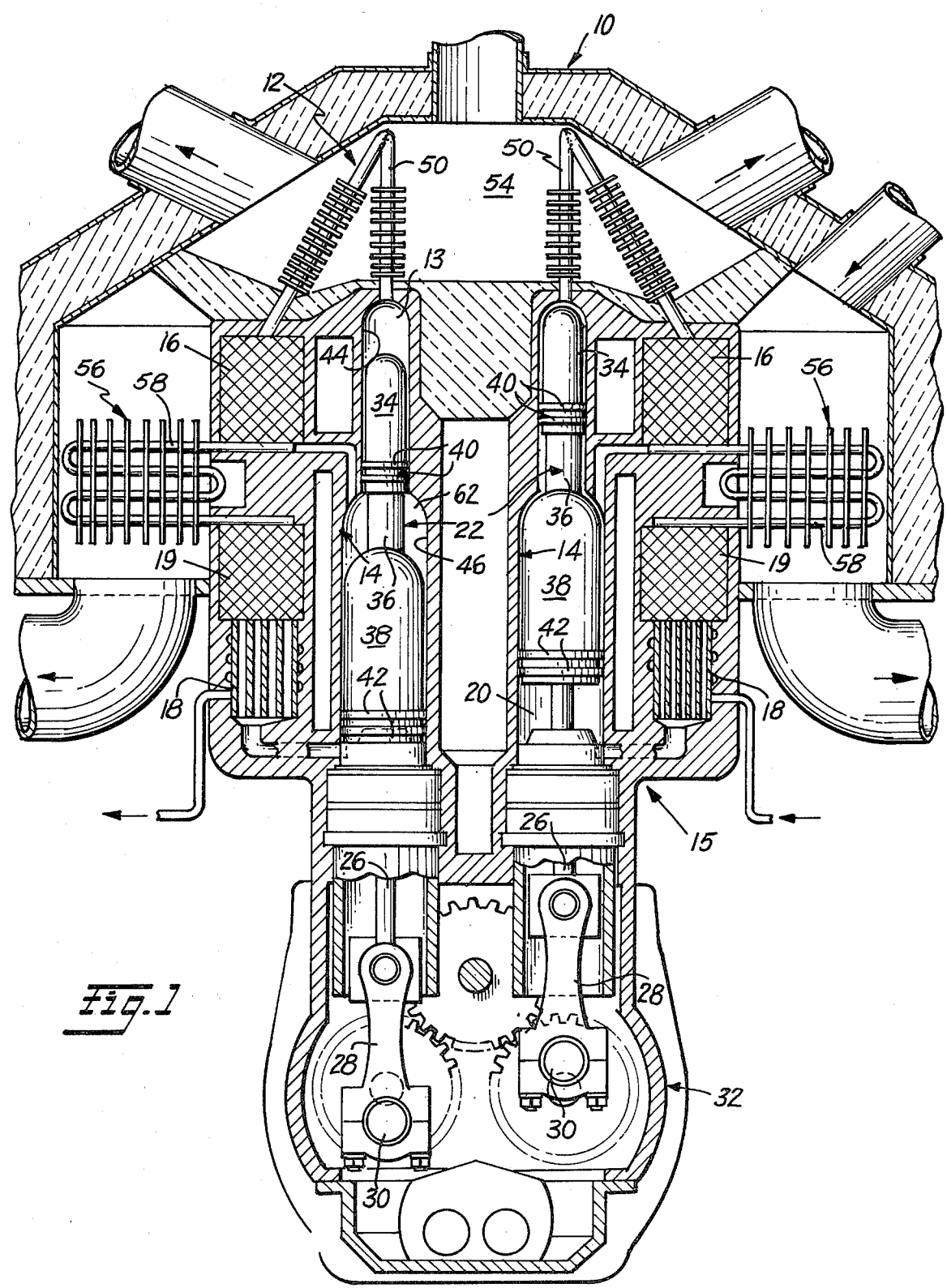
FIG. 1 is a sectional elevation of a Stirling engine made in accordance with this invention and configured as a prime mover with mechanical output.

Referring now to the drawings, wherein like reference characters designate identical or corresponding parts, and more particularly to FIG. 1 thereof, a kinematic Siemens type Stirling engine is shown having an insulated combustor 10 mounted on a high temperature heater 12 which in turn is connected between an expansion space 13 of a cylinder 14 in an engine block 15, and the upper section 16 of a regenerator. A cooler 18 is connected between the lower section 19 of the regenerator and a compression space 20 of the cylinder 14. A two-stage piston 22 is mounted for reciprocating motion in each of the cylinders 14 and is connected for power transfer and coordinated movement by a piston rod 26 and a connecting rod 28 to a crankshaft 30 journalled in a crankcase 32.

The two-stage piston 22 includes a first stage or top piston 34 connected by a rod 36 to a large diameter second stage or bottom piston 38. The pistons are sealed at their lower ends by piston rings 40, 42, respectively, and reciprocate in separately-sized portions of the cylinder 14. The top piston 34 runs in a top cylinder section 44 and the bottom piston 38 runs in a bottom cylinder section 46. The piston sections 34 and 38 preferably are connected together for movement together, or they can be separately actuated to optimize the operating parameters. In addition, the relative volumes of the two cylinder sections 44 and 46 can likewise be selected to optimize the operating parameters.

The high temperature heater 12 includes a set of finned heater tubes 50 connected between the cylinder section 44 and the upper or high temperature section 16 of the regenerator. The heater tubes 50 project into a combustion space 54 within the combustor 10 where they absorb heat from the hot combustion gases and transfer the heat to a working gas such as hydrogen circulating through the heater tubes 50. A second stage heater 56 is provided to utilize lower temperature heat. It includes a series of serpentine heater tubes 58 connected between the lower section 46 of the cylinder 14 and the lower or low temperature section 19 of the regenerator. The cooler 18 is connected between the cool end of the low temperature regenerator section 19 and the compression space 20 of the cylinder 14 which contains the piston which leads this piston by (360°/N) where N is the number of pistons in the engine in the known arrangement of the Siemen's engine.

In operation, the reciprocating piston 22 on the upstroke displaces gas from the first stage expansion space 13 and the second stage expansion space 62 above the second stage piston 38 through the heater tubes 50 and 58, respectively, and into the first and second stage regenerators 16 and 19 where the heat is removed from the gas and stored for the return flow. The gas is then cooled in the cooler 18 and enters the compression space 20 where it is compressed by the relative closing movement of the pistons in the connected cylinders. On the down stroke, the gas is displaced by the piston second stage 38 from the compression space 20 through the cooler 18 and into the regenerator section 19 where it is heated by the heat deposited by the gas on its flow toward the cooler on the previous upstroke. All of the gas then flows through the second stage heater 56 where it is raised to the temperature of the lower temperature heat source, such as an industrial process or exhaust gas from this or another engine. From the second stage heater 56, the gas then divides. Part of the gas flows into the expansion space 62 where it expands against the piston section 38 and produces power. The other portion of the gas passes through the regenerator section 16 where it is raised to a high temperature by the heat that was deposited in the regenerator on the previous pass of the gas toward the cooler. The gas then flows through and is heated in the heater tubes 50 and expands in the expansion space 13 against the piston first stage 34 to produce output power.

A second embodiment of the invention, shown in the schematic diagram of FIG. 2, is a free piston Stirling engine having a heater 70 mounted atop a hermetic vessel 72 which includes a small diameter cylinder 74 and a large diameter cylinder 76. The cylinder 74–76 contains a two-stage free piston displacer 80 which is linked by a gas spring 82 to a grounding post 83 in the manner taught in U.S. Patent Application Ser. No. 168,714 filed on July 14, 1980, by Harlan White, but shown here only schematically. A power piston 84 has a linear alternator armature 86 attached to its mid-section which reciprocates in an annular linear alternator stator 87 to produce electrical power. A piston end 88 at the end of the power piston 84 operates in a closed chamber 90 where it functions as a gas spring.

A high temperature regenerator 92 is disposed in the gas path between the high temperature heater 70 and a lower temperature heater 94. A lower temperature regenerator 96 is connected between the lower temperature heater 94 and a cooler 98.

In operation, the displacer moves upwardly in the cylinder 74–76 to displace working gas from an expansion space 100 above the top or first stage of the displacer 80 and an expansion space 102 above the lower or second stage of the displacer 80. The displaced gas from the expansion space 100 passes through the heater 70 and into the regenerator 92 where it deposits its heat and then flows into the lower temperature heater 94 along with the gas displaced from the second stage expansion space 102. The gas from the lower temperature heater 94 passes into the lower temperature regenerator 96 where it deposits its heat and then flows into the cooler where it is cooled and passed to a compression space 104 between the displacer 80 and the power piston 84. On the downward stroke of the displacer 80, the compressed gas is displaced from the compression space 104 and flows through the cooler 98, thence into the regenerator 96 where it is heated by the heat deposited by the gas on its trip toward the cooler. The gas all flows through the lower temperature heater 94 where it is heated by a moderate heat source such as an industrial process or exhaust gas from this or another engine. The gas flow then splits, part of it entering the expansion space 102 where it expands against the power piston 84 to produce useful work. The other portion of the gas passes through the regenerator 92 where it is raised to a high temperature by the heat deposited in the previous pass of the gas and then through the high temperature heater 70 and into the expansion space 100. The high pressure of the gas in the expansion space is exerted against the top face of the power piston 84 causing the power piston to move downwardly on the power stroke.

The piston-displacer Stirling engine shown schematically in FIG. 3 includes a two-stage displacer 110 reciprocating in a two diameter cylinder 112. A power piston 114 reciprocates in the lower end of the cylinder 112. A crankshaft shown schematically at 116 is driven by the power piston 114 on the expansion stroke and drives the power piston on the compression stroke, and also drives the displacer 110 about 70°–80° leading the power piston.

Figures 3A, 3B, 3C, 3D:
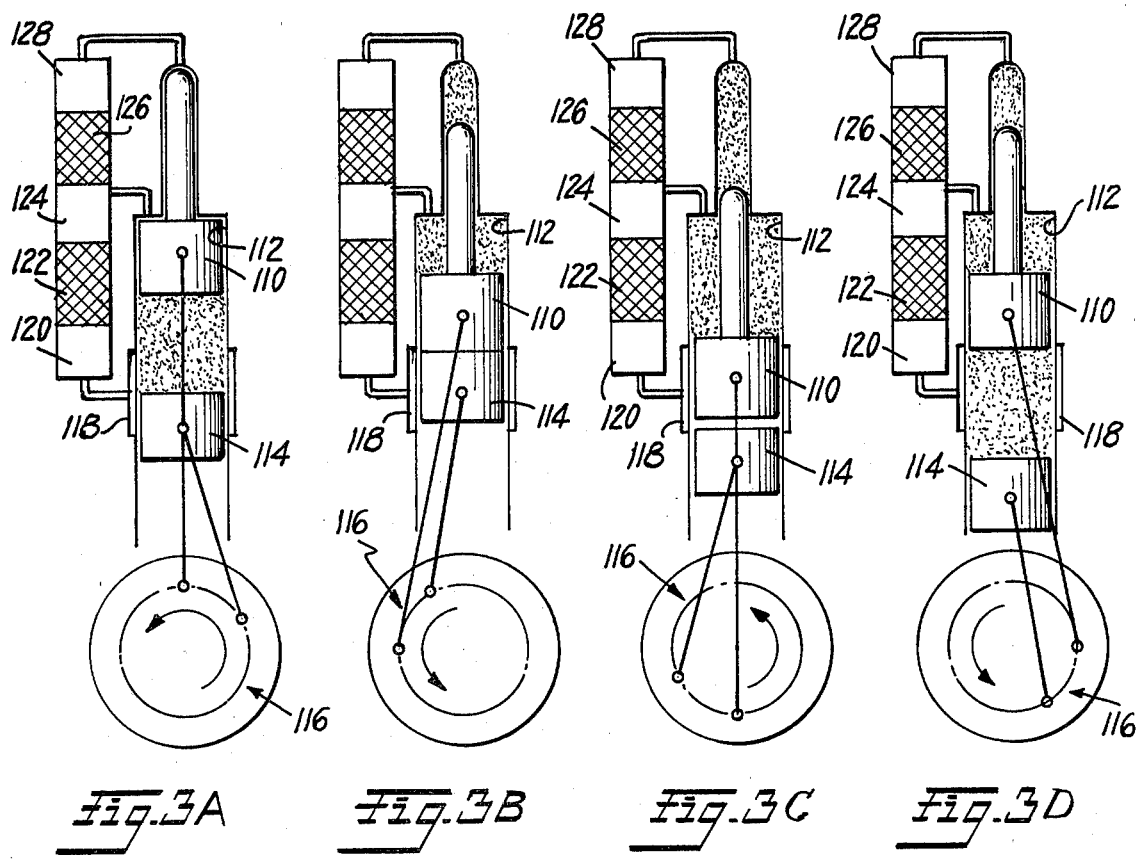
FIG. 3 is a schematic diagram of a Stirling engine according to this invention configured as a piston-displacer machine and showing four positions 90° apart in the engine cycle.
Figure 4:
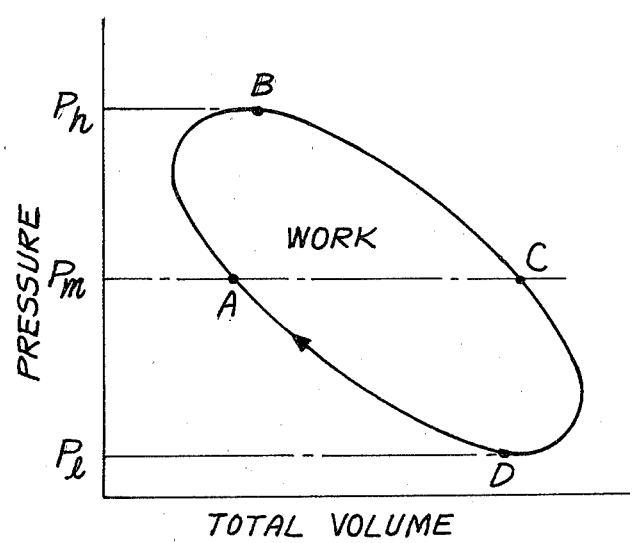
FIG. 4 is a pressure-volume diagram showing the work output and work input of the power piston working in the compression and expansion space.
Figure 5:
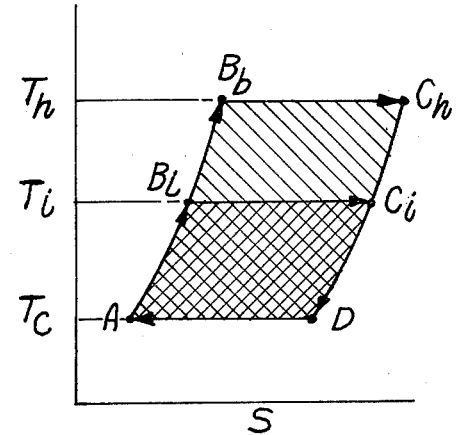
FIG. 5 is temperature-entropy diagram showing the work output of an engine made in accordance with this invention, and showing the additional work that the use of this invention produces.

In operation, assume that the displacer is in its uppermost position and the power piston is slightly above its neutral position, as shown in FIG. 3A. At this point all of the working fluid is in the compression volume at the mean cycle pressure $P_m$ and the lowest cycle temperature $T_c$ and entropy $S_c$ as shown in FIGS. 4 and 5.

As the crankshaft 116 rotates toward the position shown in FIG. 3B, the piston 114 moves up to TDC, completing the compression phase, and the displacer begins its downward stroke, displacing working gas through a manifold 118 and cooler 120, and into the intermediate regenerator 122 where it absorbs the heat deposited on the previous pass of the gas in the other direction. The warm gas now all passes through the intermediate heater 124 and one portion expands into the large diameter lower end of the cylinder 112. The other portion of the working gas flows through the high temperature regenerator 126 where it absorbs the heat deposited on the previous pass in the other direction, and then flows through the high temperature heater 128 and expands into the narrow diameter top end of the cylinder 112. Heating of the working fluid to the intermediate temperature $T_c$ in the regenerator 122 and the heater 124, and the hot end temperature $T_h$ in the regenerator 126 and the heater 128 raises the cycle pressure to the high pressure $P_h$ and prepares the cycle for the work producing expansion processes.

Between the positions shown in FIGS. 3B and 3C, the displacer and power piston move down together until the piston moves through its lowest position. During this process the gas is expanding and producing a net output of useful work in the form of mechanical energy. The expansion process continues until the lowest cycle pressure is reached, in the position illustrated in FIG. 3D.

During completion of the cycle, in moving between the positions shown in FIGS. 3D to 3A, the working fluid pressure returns to the mean cycle pressure $P_m$ by reaching the total system volume and displacing fluid from the compression volume to the expansion volume. The working fluid entering the compression volume is cooled in the regenerators and cooler. Cooling of the working fluid in the cooler represents the heat rejection phase of the cycle for this new heat engine configuration. The useful work produced is given by the first law of thermodynamics.

[Useful Work Produced] =

$$\begin{bmatrix} \text{Heat added in the intermediate and hot end heat exchangers processes a to c} \end{bmatrix} - \begin{bmatrix} \text{Heat Rejected in the cooler processes c to a} \end{bmatrix}$$

The thermal efficiency of the cycle is:

$$\tau_t = \frac{[\text{Heat added}] - [\text{Heat rejected}]}{[\text{Heat added}]}.$$

The total work produced by the thermodynamic system is represented by the area within the T-S diagram in FIG. 5. The large area, that is, the combined hatched and cross-hatched areas, represents the work produced by a unit mass of working fluid traversing the high and intermediate heaters. The smaller, cross-hatched area represents the work output produced by a unit mass of the working fluid traversing the intermediate temperature heater only. This added work, which would not itself warrant the cost of an engine, is in a sense "free" because it utilizes a source of energy that normally would be wasted and can be recovered and applied to useful work by the engine of this invention.

Thus, a two-stage harmonic reciprocating engine has been shown capable of absorbing heat at two temperatures, a high temperature and a lower intermediate temperature. The intermediate temperature absorption mode permits the engine to utilize sources of heat which are normally too low to be economically useful. The high temperature heater in the engine enables the system to operate with higher efficiency and power density than would be possible with the utilization of low temperature heat only.

Obviously, numerous modifications and variations of the disclosed embodiment will occur to those skilled in the art in view of this disclosure. It is thus expressly to be understood that these modifications and variations, and equivalence thereof, may be practiced while remaining in the spirit and scope of the invention as defined in the following claims.

What is claimed is:

1. A heat engine for utilizing intermediate temperature heat and high temperature heat for high efficiency heat utilization, wherein the improvement comprises:
   a vessel enclosing a working space adapted to be charged with a working fluid;
   said working space having a compression space and a two stage expansion space including a high temperature expansion space and an intermediate temperature expansion space, for expanding the heated fluid against a movable piston to produce work output;
   a two stage displacer reciprocally mounted in said working space for displacing the working fluid between said compression space and said expansion space through two partially separate and partially overlapping fluid paths;
   two separate heaters for receiving the fluid from, and passing fluid to said expansion space, including a high temperature heater for heating the working fluid to be expanded in said high temperature expansion space with heat received from a high temperature heat source, and an intermediate temperature heater for heating the working fluid to be expanded in said intermediate temperature expansion space with heat received from an intermediate temperature heat source;
   a first regenerator in series with said high temperature heater for receiving heated fluid from, and passing regeneratively heated fluid to, said high temperature heater, and for cyclically removing heat from said fluid, storing the heat and returning the heat to the fluid on the return flow;
   a second regenerator in said fluid path for receiving heated fluid from, and passing regeneratively heated fluid to, said intermediate temperature heat exchanger; and
   a cooler for cooling and passing regeneratively cooled fluid from said second regenerator to said compression space, and for recooling said fluid after compression and passing it to said second regenerator under the influence of said displacer.

2. The heat engine defined in claim 1, wherein said second regenerator receives the fluid from said first regenerator and passes the entire flow of fluid from said first regenerator and said intermediate heater to said cooler.

* * * * *